(12) United States Patent
Han et al.

(10) Patent No.: US 9,165,404 B2
(45) Date of Patent: Oct. 20, 2015

(54) METHOD, APPARATUS, AND SYSTEM FOR PROCESSING VIRTUAL WORLD

(75) Inventors: Seung Ju Han, Seoul (KR); Jae Joon Han, Seoul (KR); Do Kyoon Kim, Seongnam-si (KR); Jung Bae Kim, Hwaseong-si (KR); Young Kyoo Hwang, Seoul (KR); Won Chul Bang, Seongnam-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 458 days.

(21) Appl. No.: 13/547,747

(22) Filed: Jul. 12, 2012

(65) Prior Publication Data

US 2013/0016124 A1 Jan. 17, 2013

Related U.S. Application Data

(60) Provisional application No. 61/507,697, filed on Jul. 14, 2011.

(30) Foreign Application Priority Data

Nov. 22, 2011 (KR) .................. 10-2011-0122207

(51) Int. Cl.
| | |
|---|---|
| *G06T 19/00* | (2011.01) |
| *G09G 5/00* | (2006.01) |
| *A63F 13/30* | (2014.01) |
| *G06F 3/01* | (2006.01) |
| *G06T 13/40* | (2011.01) |
| *G06K 9/00* | (2006.01) |
| *G06T 13/20* | (2011.01) |
| *A63F 13/00* | (2014.01) |

(52) U.S. Cl.
CPC ............... *G06T 19/00* (2013.01); *A63F 13/12* (2013.01); *G06F 3/011* (2013.01); *G06K 9/00* (2013.01); *G06T 13/20* (2013.01); *G06T 13/40* (2013.01); *G09G 5/00* (2013.01); *G06T 2207/30201* (2013.01)

(58) Field of Classification Search
CPC ..... G06T 7/2033; G06T 17/00; G06T 7/2046; G06T 13/80; G06T 19/00; G06T 2207/30201; G06K 9/00221

See application file for complete search history.

(56) References Cited

U.S. PATENT DOCUMENTS

| | | | | |
|---|---|---|---|---|
| 6,163,322 | A * | 12/2000 | LaChapelle | 345/473 |
| 7,068,277 | B2 | 6/2006 | Menache | |
| 2008/0300010 | A1 * | 12/2008 | Border et al. | 455/556.1 |
| 2009/0066700 | A1 * | 3/2009 | Harding et al. | 345/473 |
| 2010/0149177 | A1 * | 6/2010 | Miller | 345/419 |
| 2011/0069879 | A1 * | 3/2011 | Hwang et al. | 382/154 |
| 2013/0007013 | A1 * | 1/2013 | Geisner et al. | 707/748 |

FOREIGN PATENT DOCUMENTS

| | | |
|---|---|---|
| KR | 2001-0084996 | 9/2001 |
| KR | 10-2011-0075372 | 7/2011 |
| KR | 10-2011-0081364 | 7/2011 |

* cited by examiner

*Primary Examiner* — Mark Zimmerman
*Assistant Examiner* — Nurun N Flora
(74) *Attorney, Agent, or Firm* — NSIP Law

(57) ABSTRACT

An apparatus and method for processing a virtual world. The apparatus for controlling a facial expression of an avatar in a virtual world using a facial expression of a user in a real world may include a receiving unit to receive sensed information that is sensed by an intelligent camera, the sensed information relating to a facial expression basis of the user, and a processing unit to generate facial expression data of the user for controlling the facial expression of the avatar, using initialization information representing a parameter for initializing the facial expression basis of the user, a 2-dimensional/3-dimensional (2D/3D) model defining a coding method for a face object of the avatar, and the sensed information.

20 Claims, 4 Drawing Sheets

METHOD, APPARATUS, AND SYSTEM FOR PROCESSING VIRTUAL WORLD

CROSS-REFERENCE TO RELATED APPLICATIONS

This application claims the priority benefit of U.S. Provisional Patent Application No. 61/507,697 filed on Jul. 14, 2011, in the U.S. Patent and Trademark Office and of Korean Patent Application No. 10-2011-0122207 filed on Nov. 22, 2011, in the Korean Intellectual Property Office, the disclosures of both of which are incorporated herein by reference.

BACKGROUND

1. Field

Example embodiments of the following description relate to a method and apparatus for processing a virtual world, and more particularly, to a method and apparatus for controlling a facial expression of an avatar in the virtual world using a facial expression of a user in a real world.

2. Description of the Related Art

Currently, interest in experience-type games has been increasing. The MICROSOFT CORPORATION introduced "Project Natal" at the "E3 2009" Press Conference. "Project Natal" may provide a user body motion capturing function, a facial recognition function, and a voice recognition function by combining MICROSOFT's XBOX 360 game console with a separate sensor device consisting of a depth/color camera and a microphone array, thereby enabling a user to interact with a virtual world without needing a dedicated controller. Also, the SONY CORPORATION introduced "Wand" which is an experience-type game motion controller. "Wand" enables a user to interact with a virtual world by using a motion trajectory of a controller and applying, to the PlayStation 3 game console, location/direction sensing technology, which is obtained by combining a color camera, a marker, and an ultrasonic sensor.

With recent developments of technologies enabling interactions between a real world and a virtual world, technology related to an avatar in the virtual world, the avatar representing a user in the real world, is being actively researched and developed. For example, technology that processes a certain gesture made by the user and enables an avatar in the virtual world to make the same gesture as the user is under development.

Further, a human face may function as a form of communication, which conveys a host of information through a facial expression. In the field of virtual reality, an agent of the user, that is, the avatar, is the subject of an activity. Therefore, the proper modeling of the agent is an important matter. Furthermore, since the face is an object capable of conveying the most amount of information, technology achieving a more realistic level of modeling and animation is to be applied.

In the section of moving picture experts group, phase 4 (MPEG-4) and synthetic natural hybrid coding (SNHC), integrated coding of a natural image and a synthetic image based on interaction is standardized. The first standard plan suggests a face description parameter (FDP) which describes a face through coding of a face object used in the virtual world, and a facial animation parameter (FAP) which describes motions.

However, the FAP of MPEG-4 defines only motions of respective facial parts. Therefore, to achieve realistic animation of a facial expression change and lip synchronization, an operation system functioning as muscles of a real human face needs to be provided in a modeled face object.

SUMMARY

The foregoing and/or other aspects are achieved by providing a virtual world processing apparatus for controlling a facial expression of an avatar in a virtual world using a facial expression of a user in a real world, the apparatus including a receiving unit to receive sensed information from an intelligent camera, the sensed information sensed by the intelligent camera related to a facial expression basis of the user, and a processing unit to generate facial expression data of the user for controlling the facial expression of the avatar, using initialization information denoting a parameter for initializing the facial expression basis of the user, a 2-dimensional/3-dimensional (2D/3D) model defining a coding method for a face object of the avatar, and the sensed information.

The foregoing and/or other aspects are achieved by providing a virtual world processing method for controlling a facial expression of an avatar in a virtual world using a facial expression of a user in a real world, the method including receiving sensed information from an intelligent camera, the sensed information sensed by the intelligent camera related to a facial expression basis of the user, and generating facial expression data of the user for controlling the facial expression of the avatar, using initialization information denoting a parameter for initializing the facial expression basis of the user, a 2D/3D model defining a coding method for a face object of the avatar, and the sensed information.

The foregoing and/or other aspects are achieved by providing a system for enabling interaction between a real world and a virtual world, the system including an intelligent camera to detect a facial expression of a user, and to transmit sensed information relating to the detected facial expression to a virtual world processing apparatus; and the virtual world processing apparatus to control a facial expression of an avatar in the virtual world using a facial expression of the user in the real world, wherein the virtual world processing apparatus including: a receiving unit to receive the sensed information; and a processing unit to generate facial expression data of the user for controlling the facial expression of an avatar, using initialization information denoting a parameter for initializing a facial expression basis of the user, a 2-dimensional/3-dimensional (2D/3D) model defining a coding method for a face object of the avatar, and the sensed information.

The foregoing and/or other aspects are achieved by providing a virtual world processing method, the method including receiving sensed information that is sensed by an intelligent camera, the sensed information relating to a facial expression basis of a user in a real world; and controlling a facial expression of an avatar in a virtual world using facial expression data, the facial expression data being generated based on the received sensed information.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
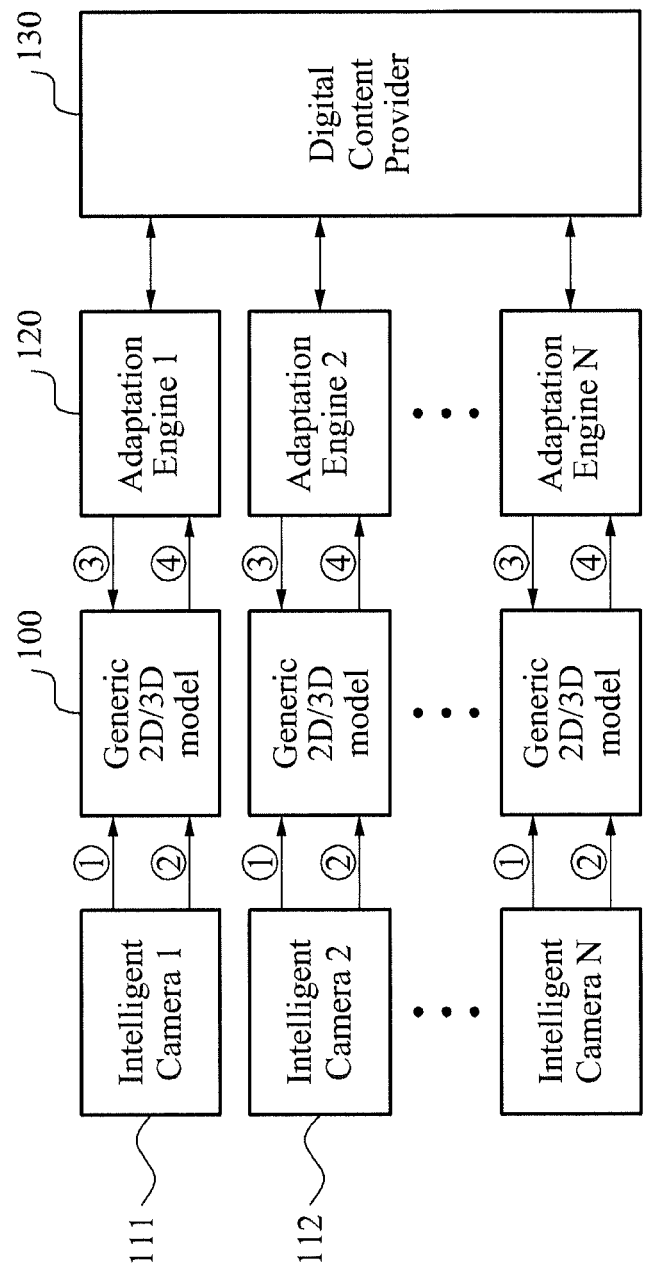
FIG. 1 illustrates a system enabling interaction between a real world and a virtual world, according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a system enabling interaction between a real world and a virtual world, according to example embodiments.

Referring to FIG. 1, the system may include an intelligent camera 111, a generic 2-dimensional/3-dimensional (2D/3D) model 100, an adaptation engine 120, and a digital content provider 130.

The intelligent camera 111 represents a sensor that detects a facial expression of a user in a real world. Depending on embodiments, a plurality of intelligent cameras 111 and 112 may be provided in the system to detect the facial expression of the user. The intelligent camera 111 may transmit the sensed information that relates to a facial expression basis to a virtual world processing apparatus. The facial expression basis is described further below, at least with respect to FIG. 3.

Table 1 shows an extensible markup language (XML) representation of syntax regarding types of the intelligent camera, according to the example embodiments.

TABLE 1

```
<!-- ################################################## -->
<!-- Definition of Facial Expression Sensor Type -->
<!-- ################################################## -->
<complexType name="FacialExpressionSensorType">
<complexContent>
<extension base="siv:IntelligentCameraType">
<sequence>
<element name="FacialExpressionBasis"
type="siv:FacialExpressionBasisType" minOccurs="0"
maxOccurs="66"/>
</sequence>
</extension>
</complexContent>
</complexType>
<complexType name="FacialExpressionBasisType">
<attribute name="facialExpressionBasisID"
type="mpeg7:termReferenceType" use="optional"/>
<attribute name="facialExpressionBasisValue" type="float"
use="optional"/>
<attribute name="facialExpressionBasisUnit" type="mpegvct:unitType"
use="optional"/>
</complexType>
```

Table 2 shows a binary representation of syntax regarding types of the intelligent camera, according to the example embodiments.

TABLE 2

| FacialExpressionSensorType { | (Number of bits) | (Mnemonic) |
|---|---|---|
| FacialExpressionBasisFlag | | |
| IntelligentCamera | | IntelligentCameraType |
| if(FacialExpressionBasisFlag ) { | | |
| NumOfFacialExpressionBasis | 7 | uimsbf |
| for( k=0; | | |
| k<NumOfFacialExpressionBasis; k++ ) { | | |
| FacialExpressionBasis[k] | | FacialExpressionBasisType |
| } | | |
| } | | |
| } | | |
| FacialExpressionBasisType { | | |
| facialExpressionBasisIDFlag | 1 | bslbf |
| facialExpressionBasisValueFlag | 1 | bslbf |
| facialExpressionBasisUnitFlag | 1 | bslbf |
| if(facialExpressionBasisIDFlag) { | | |
| facialExpressionBasisID | | FacialExpressionBasisIDCSType |
| } | | |
| if(facialExpressionBasisValueFlag) { | | |
| facialExpressionBasisValue | 32 | fsbf |
| } | | |
| if(facialExpressionBasisUnitFlag) { | | |
| facialExpressionBasisUnit | | unitType |
| } | | |
| } | | |

Table 3 shows descriptor components of semantics regarding the types of the intelligent camera, according to the example embodiments.

TABLE 3

| Name | Definition |
| --- | --- |
| FacialExpressionSensorType | Tool for describing a facial expression sensor. |
| FacialExpressionBasisFlag | This field, which is only present in the binary representation, signals the presence of the activation attribute. A value of "1" means the attribute shall be used and "0" means the attribute shall not be used. |
| NumOfFacialExpressionBasis | This field, which is only present in the binary representation, indicates the number of facial expression basis in this sensed information. |
| FacialExpressionBasis | Describes each facial expression basis detected by the camera. |
| FacialExpressionBasisType | Tool for describing each facial expression basis. |
| facialExpressionBasisIDFlag | This field, which is only present in the binary representation, signals the presence of the activation attribute. A value of "1" means the attribute shall be used and "0" means the attribute shall not be used. |
| facialExpressionBasisValueFlag | This field, which is only present in the binary representation, signals the presence of the activation attribute. A value of "1" means the attribute shall be used and "0" means the attribute shall not be used. |
| facialExpressionBasisUnitFlag | This field, which is only present in the binary representation, signals the presence of the activation attribute. A value of "1" means the attribute shall be used and "0" means the attribute shall not be used. |
| facialExpressionBasisID | Describes the identification of the associated facial expression basis based as a reference to the classification scheme term provided by FacialExpressionBasisIDCS defined in A.X of ISO/IEC 23005-X. |
| facialExpressionBasisValue | Describes the value of the associated facial expression basis. |
| facialExpressionBasisUnit | Describes the unit of each facial expression basis. The default unit is a percent. Note 1: the unit of each facial expression basis can be relatively obtained by the range provided by the FacialExpressionCharacteristicsSensorType. The minimum value shall be 0% and the maximum value shall be 100%. Note 2: the unit of each facial expression basis can also use the unit defined in Annex C of ISO/IEC14496-2. |

Table 4 shows a facial expression basis integrated data coding system (IDCS) regarding the types of the intelligent camera, according to the example embodiments.

TABLE 4

```
<ClassificationScheme uri="urn:mpeg:mpeg-v:01-CI-FacialExpressionBasisIDCS-NS">
   <Term termID="open jaw">
      <Name xml:lang="en">open jaw</Name>
      <Definition xml:lang="en">
         <!--The above describes an example of the vertical jaw displacement-->
</Definition>
</Term>
<Term termID="lower_t_midlip">
      <Name xml:lang="en">lower top middle inner lip</Name>
      <Definition xml:lang="en">
         <!--The above describes an example of the vertical top middle inner lip displacement -->
</Definition>
</Term>
<Term termID="raise_b_midlip">
      <Name xml:lang="en">raise bottom middle inner lip</Name>
      <Definition xml:lang="en">
         <!-- The above describes an example of the vertical bottom middle inner lip
displacement -->
</Definition>
</Term>
<Term termID="stretch_l_cornerlip">
      <Name xml:lang="en">stretch left inner lip corner</Name>
      <Definition xml:lang="en">
         <!--The above describes an example of the horizontal displacement of left inner lip
corner -->
</Definition>
</Term>
<Term termID="stretch_r_cornerlip">
```

TABLE 4-continued

```
        <Name xml:lang="en">stretch right inner lip corner</Name>
        <Definition xml:lang="en">
            <!--The above describes an example of the horizontal displacement, i.e., stretching, of
right inner lip corner -->
        </Definition>
    </Term>
    <Term termID="lower_t_lip_lm">
        <Name xml:lang="en">lower midpoint between left corner and middle of top inner lip</Name>
        <Definition xml:lang="en">
            <!--The above describes an example of the vertical displacement of midpoint between
left corner and middle of top inner lip -->
        </Definition>
    </Term>
    <Term termID="lower_t_lip_rm">
        <Name xml:lang="en">lower midpoint between right corner and middle of top inner lip</Name>
        <Definition xml:lang="en">
            <!--The above describes an example of the vertical displacement of midpoint between
right corner and middle of top inner lip -->
        </Definition>
    </Term>
    <Term termID="raise_b_lip_lm">
        <Name xml:lang="en">raise midpoint between left corner and middle of bottom inner lip</Name>
        <Definition xml:lang="en">
            <!--The above describes an example of the vertical displacement of midpoint between
left corner and middle of bottom inner lip -->
        </Definition>
    </Term>
    <Term termID="raise_b_lip_rm">
        <Name xml:lang="en">raise midpoint between right corner and middle of bottom inner lip</Name>
        <Definition xml:lang="en">
            <!--The above describes an example of the vertical displacement of midpoint between
right corner and middle of bottom inner lip -->
        </Definition>
    </Term>
    <Term term I D="raise_l_cornerlip">
        <Name xml:lang="en">raise left inner lip corner</Name>
        <Definition xml:lang="en">
            <!--The above describes an example of the vertical displacement of left inner lip
corner -->
        </Definition>
    </Term>
    <Term termID="raise_r_cornerlip">
        <Name xml:lang="en">raise right inner lip corner</Name>
        <Definition xml:lang="en">
            <!--The above describes an example of the vertical displacement of right inner lip
corner -->
        </Definition>
    </Term>
    <Term termID="thrust_jaw">
        <Name xml:lang="en">thrust jaw</Name>
        <Definition xml:lang="en">
            <!--The above describes an example of the depth displacement of jaw -->
        </Definition>
    </Term>
    <Term termID="shift_jaw">
        <Name xml:lang="en">shift jaw</Name>
        <Definition xml:lang="en">
            <!--The above describes an example of the side to side displacement, i.e., shifting, of
the jaw -->
        </Definition>
    </Term>
    <Term termID="push_b_lip">
        <Name xml:lang="en">push bottom middle lip</Name>
        <Definition xml:lang="en">
<!--The above describes an example of the depth displacement of the bottom middle lip -->
        </Definition>
    </Term>
    <Term termID="push_t_lip">
        <Name xml:lang="en">push top middle lip</Name>
        <Definition xml:lang="en">
            <!--The above describes an example of the depth displacement of the top middle lip -->
        </Definition>
    </Term>
    <Term termID="depress_chin">
        <Name xml:lang="en">depress chin</Name>
        <Definition xml:lang="en">
```

TABLE 4-continued

```
        <!--The above describes an example of the upward and compressing movement of
the chin (for example, in the facial expression of sadness) -->
    </Definition>
</Term>
<Term termID="close_t_l_eyelid">
    <Name xml:lang="en">close top left eyelid</Name>
    <Definition xml:lang="en">
        <!--The above describes an example of the vertical displacement of the top left eyelid-->
    </Definition>
</Term>
<Term term I D="close_t_r_eyelid">
    <Name xml:lang="en">close top right eyelid</Name>
    <Definition xml:lang="en">
        <!--The above describes an example of the vertical displacement of the top right
eyelid -->
    </Definition>
</Term>
<Term termID="close_b_l_eyelid">
    <Name xml:lang="en">close bottom left eyelid</Name>
    <Definition xml:lang="en">
        <!--The above describes an example of the vertical displacement of the bottom left
eyelid -->
    </Definition>
</Term>
<Term termID="close_b_r_eyelid">
    <Name xml:lang="en">close bottom right eyelid</Name>
    <Definition xml:lang="en">
        <!--The above describes an example of the vertical displacement of the bottom right
eyelid -->
    </Definition>
</Term>
<Term termID="yaw_l_eyeball">
    <Name xml:lang="en">yaw left eyeball</Name>
    <Definition xml:lang="en">
        <!--The above describes an example of the horizontal orientation of the left eyeball -->
    </Definition>
</Term>
<Term termID="yaw_r_eyeball">
    <Name xml:lang="en">yaw right eyeball</Name>
    <Definition xml:lang="en">
        <!--The above describes an example of the horizontal orientation of the right eyeball -->
    </Definition>
</Term>
<Term termID="pitch_l_eyeball">
    <Name xml:lang="en">pitch left eyeball</Name>
    <Definition xml:lang="en">
        <!--The above describes an example of the vertical orientation of the left eyeball -->
    </Definition>
</Term>
<Term termID="pitch_r_eyeball">
    <Name xml:lang="en">pitch right eyeball</Name>
    <Definition xml:lang="en">
        <!--The above describes an example of the vertical orientation of the right eyeball -->
    </Definition>
</Term>
<Term termID="thrust_l_eyeball">
    <Name xml:lang="en">thrust left eyeball</Name>
    <Definition xml:lang="en">
        <!--The above describes an example of the depth displacement of the left eyeball -->
    </Definition>
</Term>
<Term termID="thrust_r_eyeball">
    <Name xml:lang="en">thrust right eyeball</Name>
    <Definition xml:lang="en">
        <!--The above describes an example of the depth displacement of the right eyeball -->
    </Definition>
</Term>
<Term termID="dilate_l_pupil">
    <Name xml:lang="en">dilate left pupil</Name>
    <Definition xml:lang="en">
        <!--The above describes an example of the dilation of the left pupil -->
    </Definition>
</Term>
<Term termID="dilate_r_pupil>
    <Name xml:lang="en">dilate right pupil</Name>
    <Definition xml:lang="en">
        <!--The above describes an example of the dilation of the right pupil -->
    </Definition>
</Term>
<Term termID="raise_l_i_eyebrow">
```

TABLE 4-continued

```
        <Name xml:lang="en">raise left inner eyebrow</Name>
        <Definition xml:lang="en">
            <!--The above describes an example of the vertical displacement of the left inner eyebrow -->
        </Definition>
    </Term>
    <Term termID="raise_r_i_eyebrow">
        <Name xml:lang="en">raise right inner eyebrow</Name>
        <Definition xml:lang="en">
            <!--The above describes an example of the vertical displacement of the right inner eyebrow -->
        </Definition>
    </Term>
    <Term termID="raise_l_m_eyebrow">
        <Name xml:lang="en">raise left middle eyebrow</Name>
        <Definition xml:lang="en">
            <!--The above describes an example of the vertical displacement of the left middle eyebrow -->
        </Definition>
    </Term>
    <Term termID="raise_r_m_eyebrow">
        <Name xml:lang="en">raise right middle eyebrow</Name>
        <Definition xml:lang="en">
            <!--The above describes an example of the vertical displacement of the right middle eyebrow -->
        </Definition>
    <Term>
    <Term termID="raise_l_o_eyebrow">
        <Name xml:lang="en">raise left outer eyebrow</Name>
        <Definition xml:lang="en">
            <!--The above describes an example of the vertical displacement of the left outer eyebrow -->
        </Definition>
    <Term>
    <Term termID="raise_r_o_eyebrow">
        <Name xml:lang="en">raise right outer eyebrow</Name>
        <Definition xml:lang="en">
            <!--The above describes an example of the vertical displacement of the right outer eyebrow -->
        </Definition>
    </Term>
    <Term termID="squeeze_l_eyebrow">
        <Name xml:lang="en">squeeze left eyebrow</Name>
        <Definition xml:lang="en">
            <!--The above describes an example of the horizontal displacement of the left eyebrow -->
        </Definition>
    </Term>
    <Term termID="squeeze_r_eyebrow">
        <Name xml:lang="en">squeeze right eyebrow</Name>
        <Definition xml:lang="en">
            <!--The above describes an example of the horizontal displacement of the right eyebrow -->
        </Definition>
    </Term>
    <Term termID="puff_l_cheek">
        <Name xml:lang="en">puff left cheek</Name>
        <Definition xml:lang="en">
            <!--The above describes an example of the horizontal displacement of the left cheek -->
        </Definition>
    </Term>
    <Term termID="puff_r_cheek">
        <Name xml:lang="en">puff right cheek</Name>
        <Definition xml:lang="en">
            <!--The above describes an example of the horizontal displacement of the right cheek-->
        </Definition>
    </Term>
    <Term termID="lift_l_cheek">
        <Name xml:lang="en">lift left cheek</Name>
        <Definition xml:lang="en">
            <!--The above describes an example of the vertical displacement of the left cheek -->
        </Definition>
    </Term>
    <Term termID="lift_r_cheek">
        <Name xml:lang="en">lift right cheek</Name>
        <Definition xml:lang="en">
            <!--The above describes an example of the vertical displacement of the right cheek -->
        </Definition>
    </Term>
    <Term termID="shift_tongue_tip">
```

TABLE 4-continued

```
        <Name xml:lang="en">shift tongue tip</Name>
        <Definition xml:lang="en">
            <!--The above describes an example of the horizontal displacement of the tongue tip -->
        </Definition>
</Term>
<Term termID="raise_tongue_tip">
        <Name xml:lang="en">raise tongue tip</Name>
        <Definition xml:lang="en">
            <!--The above describes an example of the vertical displacement of the tongue tip -->
        </Definition>
</Term>
<Term termID="thrust_tongue_tip">
        <Name xml:lang="en">thrust tongue tip</Name>
        <Definition xml:lang="en">
            <!--The above describes an example of the depth displacement of the tongue tip -->
        </Definition>
</Term>
<Term termID="raise_tongue">
        <Name xml:lang="en">raise tongue</Name>
        <Definition xml:lang="en">
            <!--The above describes an example of the vertical displacement of the tongue -->
        </Definition>
</Term>
<Term termID="tongue_roll">
        <Name xml:lang="en">tongue roll</Name>
        <Definition xml:lang="en">
            <!--The above describes an example of the rolling of the tongue into U shape -->
        </Definition>
</Term>
<Term termID="head_pitch">
        <Name xml:lang="en">head pitch</Name>
        <Definition xml:lang="en">
            <--The above describes an example of the head pitch angle from top of the spine -->
        </Definition>
</Term>
<Term termID="head_yaw">
        <Name xml:lang="en">head yaw</Name>
        <Definition xml:lang="en">
            <!--The above describes an example of the head yaw angle from top of the spine-->
        </Definition>
<Term>
<Term termID="head_roll">
        <Name xml:lang="en">head roll<Name>
                <Definition xml:lang="en">
            <!--The above describes an example of the head roll angle from top of the spine-->
        </Definition>
<Term>
<Term termID="lower_t_midlip_o">
        <Name xml:lang="en">lower top middle outer lip</Name>
        <Definition xml:lang="en">
            <!--The above describes an example of the vertical top middle outer lip displacement-->
        </Definition>
</Term>
<Term termID="raise_b_midlip_o">
        <Name xml:lang="en">raise bottom middle outer lip</Name>
        <Definition xml:lang="en">
            <!--The above describes an example of the vertical bottom middle outer lip
displacement-->
        </Definition>
</Term>
<Term termID="stretch_l_cornerlip_o">
        <Name xml:lang="en">stretch left outer lip corner</Name>
        <Definition xml:lang="en">
            <!--The above describes an example of the horizontal displacement of left outer lip
corner-->
        </Definition>
</Term>
<Term termID="stretch_r_cornerlip_o">
        <Name xml:lang="en">stretch right outer lip corner</Name>
        <Definition xml:lang="en">
            <!--The above describes an example of the horizontal displacement of right outer lip
corner -->
        </Definition>
</Term>
<Term termID="lower_t_lip_lm_o">
        <Name xml:lang="en">lower midpoint between left corner and middle of top outer lip</Name>
        <Definition xml:lang="en">
            <!--The above describes an example of the vertical displacement of midpoint between
left corner and middle of top outer lip -->
```

TABLE 4-continued

```
</Definition>
</Term>
<Term termID="lower_t_lip_rm_o">
    <Name xml:lang="en">lower midpoint between right corner and middle of top outer lip</Name>
    <Definition xml:lang="en">
        <!--The above describes an example of the vertical displacement of midpoint between right corner and middle of top outer lip -->
    </Definition>
</Term>
<Term termID="raise_b_lipim_o">
<Name xml:lang="en">raise midpoint between left corner and middle of bottom outer lip</Name>
    <Definition xml:lang="en">
        <!--The above describes an example of the vertical displacement of the midpoint between the left corner and middle of the bottom outer lip -->
    </Definition>
</Term>
<Term termID="raise_b_lip_lm_o">
    <Name xml:lang="en">raise midpoint between right corner and middle of bottom outer lip</Name>
    <Definition xml:lang="en">
        <!--The above describes an example of the vertical displacement of midpoint between right corner and middle of bottom outer lip -->
    </Definition>
</Term>
<Term termID="raise_l_cornerlip_o">
    <Name xml:lang="en">raise left outer lip corner</Name>
    <Definition xml:lang="en">
        <!--The above describes an example of the vertical displacement of left outer lip corner -->
    </Definition>
</Term>
<Term termID="raise_r_cornerlip_o">
    <Name xml:lang="en">raise right outer lip corner</Name>
    <Definition xml:lang="en">
        <!--The above describes an example of the vertical displacement of right outer lip corner -->
    </Definition>
</Term>
<Term termID="stretch_l_nose">
    <Name xml:lang="en">stretch left side of noise</Name>
    <Definition xml:lang="en">
        <!--The above describes an example of the horizontal displacement of left side of nose -->
    </Definition>
</Term>
<Term termID="stretch_r_nose">
    <Name xml:lang="en">stretch right side of noise</Name>
    <Definition xml:lang="en">
        <!--The above describes an example of the horizontal displacement of the right side of the nose -->
    </Definition>
</Term>
<Term termID="raise_nose">
    <Name xml:lang="en">raise nose tip</Name>
    <Definition xml:lang="en">
<!--The above describes an example of the vertical displacement of the nose tip -->
    </Definition>
</Term>
<Term termID="bend_nose">
    <Name xml:lang="en">bend nose tip</Name>
    <Definition xml:lang="en">
        <!--The above describes an example of the horizontal displacement of nose tip-->
    </Definition>
</Term>
<Term termID="raise_l_ear">
    <Name xml:lang="en">raise left ear</Name>
    <Definition xml:lang="en">
        <!--The above describes an example of the vertical displacement of the left ear -->
    </Definition>
</Term>
<Term termID="raise_r_ear">
    <Name xml:lang="en">raise right ear</Name>
    <Definition xml:lang="en">
        <!--The above describes an example of the vertical displacement of the right ear-->
    </Definition>
</Term>
<Term termID="pull_l_ear>
    <Name xml:lang="en">pull left ear</Name>
```

TABLE 4-continued

```
<Definition xml:lang="en">
    <!--The above describes an example of the horizontal displacement of the left ear-->
</Definition>
</Term>
<Term termID="pull_r_ear">
    <Name xml:lang="en">pull right ear</Name>
    <Definition xml:lang="en">
        <!--The above describes an example of the horizontal displacement of the right ear-->
    </Definition>
</Term>
</ClassificationScheme>
```

The 2D/3D model 100 denotes a model to define a coding method for a face object of an avatar in the virtual world. The 2D/3D model 100, according to example embodiments, may include a face description parameter (FDP), which defines a face, and a facial animation parameter (FAP), which defines motions. The 2D/3D model 100 may be used to control a facial expression of the avatar in the virtual world processing apparatus. That is, the virtual world processing apparatus may generate facial expression data of the user for controlling the facial expression of the avatar, using the 2D/3D model 100 and the sensed information received from the intelligent camera 111. In addition, based on the generated facial expression data, the virtual world processing apparatus may control a parameter value of the facial expression of the avatar.

The adaptation engine 120 denotes a format conversion engine for exchanging contents of the virtual world with the intelligent camera of the real world. FIG. 1 illustrates an example embodiment in which the system includes N adaptation engines, however, the present disclosure is not limited thereto.

The digital content provider 130 denotes a provider of various digital contents including an online virtual world, a simulation environment, a multi user game, broadcasting multimedia production, peer-to-peer multimedia production, "package type" contents, such as, a digital versatile disc (DVD) or a game, and the like, in real time or non real time. The digital content provider 130 may be a server operated by the provider.

Under the aforementioned system structure, the virtual world processing apparatus may control the facial expression of the avatar using the facial expression of the user. Hereinafter, the virtual world processing apparatus will be described in detail with reference to FIG. 2.

Figure 2:
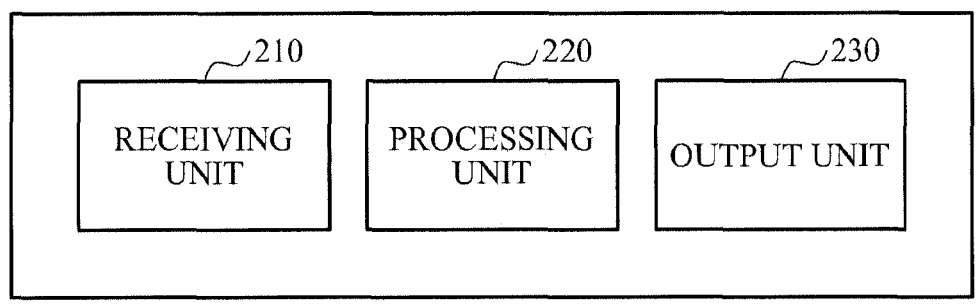
FIG. 2 illustrates a structure of a virtual world processing apparatus, according to example embodiments.

FIG. 2 illustrates a structure of a virtual world processing apparatus 200 according to example embodiments.

Referring to FIG. 2, the virtual world processing apparatus 200 may include a receiving unit 210, a processing unit 220, and, in another embodiment, may further include an output unit 230.

The receiving unit 210 may receive sensed information from an intelligent camera 111, that is, the sensed information sensed by the intelligent camera 111 with respect to a facial expression basis of a user.

The sensed information may include information on an intelligent camera facial expression basis type which defines the facial expression basis of the user, sensed by the intelligent camera 111. The intelligent camera facial expression basis type may include the facial expression basis. The facial expression basis may include at least one attribute selected from a facial expression basis identifier (ID) for identification of the facial expression basis, a parameter value of the facial expression basis, and a parameter unit of the facial expression basis.

Table 5 shows an XML representation of syntax regarding the intelligent camera facial expression basis type, according to the example embodiments.

TABLE 5

```
<!-- ############################################### -->
<!-- Definition of Intelligent Camera Facial Expression Basis Type -->
<!-- ############################################### -->
<complexType name="IntelligentCameraFacialExpressionBasisType">
<complexContent>
<extension base="siv:IntelligentCameraType">
<sequence>
<element name="FacialExpressionBasis" type="siv:FacialExpressionBasisType" minOccurs="0" maxOccurs="66"/>
</sequence>
</extension>
</complexContent>
</complexType>
<complexType name="FacialExpressionBasisType">
<attribute name="FacialExpressionBasisID" type="mpeg7:termReferenceType" use="optional"/>
<attribute name="FacialExpressionBasisParameter" type="float" use="optional"/>
<attribute name="FacialExpressionBasisParameterUnit" type="mpegvct:unitType" use="optional"/>
</complexType>
```

The processing unit 220 may generate facial expression data of the user, for controlling the facial expression of the avatar, using (1) initialization information denoting a parameter for initializing the facial expression basis of the user, (2) a 2D/3D model defining a coding method for a face object of the avatar, and (3) the sensed information.

The initialization information may denote a parameter for initializing the facial expression of the user. Depending on embodiments, for example, when the avatar represents an animal, a facial shape of the user in the real world may be different from a facial shape of the avatar in the virtual world. Accordingly, normalization of the facial expression basis with respect to the face of the user is required. Therefore, the processing unit 220 may normalize the facial expression basis using the initialization information.

The initialization information may be received from any one of the intelligent camera 111 and an adaptation engine 120. That is, when the user has not photographed his or her face using the intelligent camera 111, a sensing operation is necessary, in which the user senses the facial expression basis of his or her face using the intelligent camera 111. However, since such initialization requires a dedicated time, the intelligent camera 111 may be designed to store the initialization information in a database (DB) of the adaptation engine or a server for reuse of the initialization information once the initialization is completed. For example, when control of the facial expression of the avatar is required again with respect to the same user or when another intelligent camera different from the intelligent camera used in the initialization operation is to be used, the virtual world processing apparatus 200 may reuse previous initialization information, without requiring the user to perform the initialization operation again.

When the initialization information is sensed by the intelligent camera 111, the initialization information may include information on an initialization intelligent camera facial expression basis type that defines a parameter for initializing the facial expression basis of the user, sensed by the intelligent camera 111.

Figure 3:
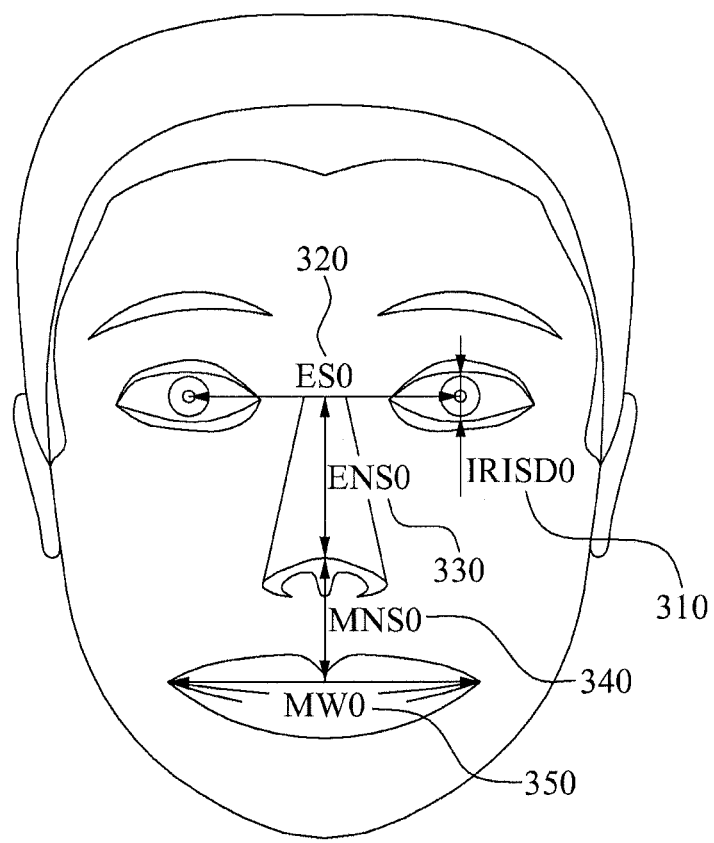
FIG. 3 illustrates a parameter for initializing a facial expression basis of a user, according to example embodiments.

In addition, referring to FIG. 3, the initialization intelligent camera facial expression basis type may include at least one element selected from (1) a distance (IRISD0) 310 between an upper eyelid and a lower eyelid while the user has a neutral facial expression, (2) a distance (ES0) 320 between two eyes while the user has the neutral facial expression, (3) a distance (ENS0) 330 between the two eyes and a nose while the user has the neutral facial expression, (4) a distance (MNS0) 340 between the nose and a mouth while the user has neutral facial expression, (5) a width (MW0) 350 of the mouth while the user has the neutral facial expression, and (6) a facial expression basis range with respect to a parameter value of the facial expression basis of the user.

Elements of the facial expression basis range may include at least one attribute selected from an ID (FacialExpressionBasisID) for identification of the facial expression basis, a maximum value (MaxFacialExpressionBasisParameter) of the parameter value of the facial expression basis, a minimum value (MinFacialExpressionBasisParameter) of the parameter value of the facial expression basis, a neutral value (NeutralFacialExpressionBasisParameter) denoting the parameter value of the facial expression basis in the neutral facial expression, and a parameter unit (FacialExpressionBasisParameterUnit) of the facial expression basis.

Table 6 shows an XML representation of syntax regarding the initialization intelligent camera facial expression basis type, according to the example embodiments.

TABLE 6

```
<!-- ################################################## -->
<!-- Definition of Initialize Intelligent Camera Facial Expression Basis Type -->
<!-- ################################################## -->
<complexType name="InitializeIntelligentCameraFacialExpressionBasisType">
<complexContent>
<extension base="iidl:SensedInfoBaseType">
<sequence>
<element name="IRISD0" type="float" minOccurs="0"/>
<element name="ES0" type="float" minOccurs="0"/>
<element name="ENS0" type="float" minOccurs="0"/>
<element name="MNS0" type="float" minOccurs="0"/>
<element name="MW0" type="float" minOccurs="0"/>
<element name="FacialExpressionBasisRange" type="siv:FacialExpressionBasisRangeType" minOccurs="0" maxOccurs="66"/>
</sequence>
</extension>
</complexContent>
</complexType>
<complexType name="FacialExpressionBasisRangeType">
<attribute name="FacialExpressionBasisID" type="mpeg7:termReferenceType" use="optional"/>
<attribute name="MaxFacialExpressionBasisParameter" type="float" use="optional"/>
<attribute name="MinFacialExpressionBasisParameter" type="float" use="optional"/>
<attribute name="NeutralFacialExpressionBasisParameter" type="float" use="optional"/>
<attribute name="FacialExpressionBasisParameterUnit" type="mpegvct:unitType" use="optional"/>
</complexType>
```

When the initialization information stored in the DB of the adaptation engine or the server is called, the initialization information according to the example embodiments may include information on an initialization intelligent camera device command that defines a parameter for initializing the facial expression basis of the user, stored in the DB.

In addition, referring to FIG. 3, the initialization intelligent camera device command may include at least one element selected from (1) the distance (IRISD0) 310 between the upper eyelid and the lower eyelid while the user has the neutral facial expression, (2) the distance (ES0) 320 between two eyes while the user has neutral facial expression, (3) the distance (ENS0) 330 between the two eyes and the nose while the user has the neutral facial expression, (4) the distance (MNS0) 340 between the nose and the mouth while the user has the neutral facial expression, (5) the width (MW0) 350 of the mouth while the user has the neutral facial expression, and (6) the facial expression basis range with respect to the parameter value of the facial expression basis of the user.

Also, the elements of the facial expression basis range may include at least one attribute selected from the ID (FacialExpressionBasisID) for identification of the facial expression basis, the maximum value (MaxFacialExpressionBasisParameter) of the parameter value of the facial expression basis, the minimum value (MinFacialExpressionBasisParameter) of the parameter value of the facial expression basis, the neutral value (NeutralFacialExpressionBasisParameter) denoting the parameter value of the facial expression basis in the neutral facial expression, and the parameter unit (FacialExpressionBasisParameterUnit) of the facial expression basis.

Table 7 shows an XML representation of syntax regarding the initialization intelligent camera device command, according to the example embodiments.

TABLE 7

```xml
<!-- ################################################## -->
<!-- Definition of DCV Intelligent camera Initialization Type -->
<!-- ################################################## -->
<complexType name="InitializeFacialExpressionParameterType">
<complexContent>
<extension base="iidl:DeviceCommandBaseType">
<sequence>
<element name="IRISD0" type="float" minOccurs="0"/>
<element name="ES0" type="float" minOccurs="0"/>
<element name="ENS0" type="float" minOccurs="0"/>
<element name="MNS0" type="float" minOccurs="0"/>
<element name="MW0" type="float" minOccurs="0"/>
<element name="FacialExpressionBasisRange" type="dcv:FacialExpressionBasisRangeType"
minOccurs="0" maxOccurs="66"/>
</sequence>
</extension>
</complexContent>
</complexType>
<complexType name="FacialExpressionBasisRangeType">
<attribute name="FacialExpressionBasisID" type="mpeg7:termReferenceType" use="optional"/>
<attribute name="MaxFacialExpressionBasisParameter" type="float" use="optional"/>
<attribute name="MinFacialExpressionBasisParameter" type="float" use="optional"/>
<attribute name="NeutralFacialExpressionBasisParameter" type="float" use="optional"/>
<attribute name="Facial Expression BasisParameterUnit" type="mpegvct:unitType"
use="optional"/>
</complexType>
```

Table 8 shows an XML representation of syntax regarding a facial morphology sensor type, according to example embodiments.

TABLE 8

```xml
<!-- ################################################## -->
<!-- Definition of Facial Morphology Sensor Type -->
<!-- ################################################## -->
<complexType name="FacialMorphologySensorType">
<complexContent>
<extension base="iidl:SensedInfoBaseType">
<sequence>
<element name="IrisDiameter" type="float" minOccurs="0"/>
<element name="EyeSeparation" type="float" minOccurs="0"/>
<element name="EyeNoseSeparation" type="float" minOccurs="0"/>
<element name="MouseNoseSeparation" type="float"
minOccurs="0"/>
<element name="MouseWidth" type="float" minOccurs="0"/>
</sequence>
<attribute name="unit" type="mpegvct:unitType" use="optional"/>
</extension>
</complexContent>
</complexType>
```

Table 9 shows a binary representation of syntax regarding the facial morphology sensor type, according to the example embodiments.

TABLE 9

| FacialMorphologySensorType { | (Number of bits) | (Mnemonic) |
|---|---|---|
| IrisDiameterFlag | 1 | Bslbf |
| EyeSeparationFlag | 1 | Bslbf |
| EyeNoseSeparationFlag | 1 | Bslbf |
| MouseNoseSeparationFlag | 1 | Bslbf |
| MouseWidthFlag | 1 | Bslbf |
| unitFlag | 1 | Bslbf |
| SensedInfoBase | | SensedInfoBaseType |
|   if(IrisDiameterFlag) { | | |
|     IrisDiameter | 32 | Fsbf |
|   } | | |
|   if(EyeSeparationFlag) { | | |
|     EyeSeparation | 32 | Fsbf |
|   } | | |
|   if(EyeNoseSeparationFlag) { | | |
|     EyeNoseSeparation | 32 | Fsbf |
|   } | | |
|   if(MouseNoseSeparationFlag) { | | |
|     MouseNoseSeparation | 32 | Fsbf |
|   } | | |
|   if(MouseWidthFlag) { | | |
|     MouseWidth | 32 | Fsbf |
|   } | | |
|   if(unitFlag) { | | |
| unitFlag | | unitType |
|   } | | |
| } | | |

Table 10 shows descriptor components of semantics regarding the facial morphology sensor type, according to the example embodiments.

TABLE 10

| Name | Definition |
|---|---|
| FacialMorphologySensorType | Tool for describing a facial morphology sensor sensed information. |
| IrisDiameterFlag | This field, which is only present in the binary representation, signals the presence of the activation attribute. A value of "1" means the attribute shall be used and "0" means the attribute shall not be used. |
| EyeSeparationFlag | This field, which is only present in the binary representation, signals the presence of the activation attribute. A value of "1" means the attribute shall be used and "0" means the attribute shall not be used. |

TABLE 10-continued

| Name | Definition |
|---|---|
| EyeNoseSeparationFlag | This field, which is only present in the binary representation, signals the presence of the activation attribute. A value of "1" means the attribute shall be used and "0" means the attribute shall not be used. |
| MouseNoseSeparationFlag | This field, which is only present in the binary representation, signals the presence of the activation attribute. A value of "1" means the attribute shall be used and "0" means the attribute shall not be used. |
| MouseWidthFlag | This field, which is only present in the binary representation, signals the presence of the activation attribute. A value of "1" means the attribute shall be used and "0" means the attribute shall not be used. |
| unitFlag | This field, which is only present in the binary representation, signals the presence of the activation attribute. A value of "1" means the attribute shall be used and "0" means the attribute shall not be used. |
| IrisDiameter | Describes IRIS Diameter (by definition it is equal to the distance between upper and lower eyelid) in neutral face. |
| EyeSeparation | Describes eye separation. |
| EyeNoseSeparation | Describes eye-nose separation. |
| MouseNoseSeparation | Describes mouth-nose separation. |
| MouthWidth | Describes mouth-width separation. |
| Unit | Specifies the unit of the sensed value, if a unit other than the default unit is used, as a reference to a classification scheme term that shall be using the mpeg7:termReferenceType defined in 7.6 of ISO/IEC 15938-5:2003. The CS that may be used for this purpose is the UnitTypeCS defined in A.2.1 of ISO/IEC 23005-6 |

In addition, Table 11 shows an XML representation of syntax regarding a facial expression characteristics sensor type, according to example embodiments.

TABLE 11

```
<!-- ################################################## -->
<!-- Definition of Facial Expression Characteristics Sensor Type -->
<!-- ################################################## -->
<complexType name="FacialExpressionCharacteristicsSensorType">
<complexContent>
<extension base="iidl:SensedInfoBaseType">
<sequence>
<element name="FacialExpressionBasisRange" type="siv:FacialExpressionBasisRangeType" minOccurs="0" maxOccurs="66"/>
</sequence>
</extension>
</complexContent>
</complexType>
<complexType name="FacialExpressionBasisRangeType">
<attribute name="facialExpressionBasisID" type="mpeg7:termReferenceType" use="optional"/>
<attribute name="maxValueFacialExpressionBasis" type="float" use="optional"/>
<attribute name="minValueFacialExpressionBasis" type="float" use="optional"/>
<attribute name="neutralValueFacialExpressionBasis" type="float" use="optional"/>
<attribute name="facialExpressionBasisUnit" type="mpegvct:unitType" use="optional"/>
</complexType>
```

Table 12 shows a binary representation of syntax regarding the facial expression characteristics sensor type, according to the example embodiments.

TABLE 12

| FacialExpressionCharacteristicsSensorType { | (Number of bits) | (Mnemonic) |
|---|---|---|
| FacialExpressionBasisRangeFlag | 1 | bslbf |
| SensedInfoBase | | SensedInfoBaseType |
| if(FacialExpressionBasisRangeFlag ) { | | |
|   NumOf FacialExpressionBasisRange | 7 | uimsbf |
|   for( k=0; | | |

TABLE 12-continued

| FacialExpressionCharacteristicsSensorType { | (Number of bits) | (Mnemonic) |
|---|---|---|
|       k< NumOfFacialExpressionBasisRange ; k++ ) { | | |
|         FacialExpressionBasisRange[k] | | FacialExpressionBasisRangeType |
|       } | | |
| } | | |
| } | | |
| FacialExpressionBasisRangeType { | | |
| facialExpressionBasisIDFlag | 1 | bslbf |
| maxValueFacialExpressionBasisFlag | 1 | bslbf |
| minValueFacialExpressionBasisFlag | 1 | bslbf |
| neutralValueFacialExpressionBasisFlag | 1 | bslbf |
| facialExpressionBasisUnitFlag | 1 | bslbf |
|     if(facialExpressionBasisIDFlag) { | | |
| facialExpressionBasisID | | FacialExpressionBasisIDCSType |
|     } | | |
|     if(maxValueFacialExpressionBasisFlag) { | | |
|       maxValueFacialExpressionBasis | 32 | fsbf |
|     } | | |
|     if(minValueFacialExpressionBasisFlag) { | | |
|       minValueFacialExpressionBasis | 32 | fsbf |
|     } | | |
|     if(neutralValueFacialExpressionBasisFlag) { | | |
|       neutralValueFacialExpressionBasis | 32 | fsbf |
|     } | | |
|     if(facialExpressionBasisUnitFlag) { | | |
| facialExpressionBasisUnit | | unitType |
|     } | | |
| } | | |

Table 13 shows descriptor components of semantics regarding the facial expression characteristics sensor type, according to the example embodiments.

TABLE 13

| Name | Definition |
|---|---|
| FacialExpressionCharacteristicsSensorType | Tool for describing a facial expression characteristics sensor sensed information. |
| FacialExpressionBasisRangeFlag | This field, which is only present in the binary representation, signals the presence of the activation attribute. A value of "1" means the attribute shall be used and "0" means the attribute shall not be used. |
| NumOfFacialExpressionBasisRange | This field, which is only present in the binary representation, indicates the number of facial expression basis range in this sensed information. |
| FacialExpressionBasisRange | Describes the range of each of facial expression basis parameters. |
| FacialExpressionBasisRangeType | Tool for describing a facial expression basis range. |
| facialExpressionBasisIDFlag | This field, which is only present in the binary representation, signals the presence of the activation attribute. A value of "1" means the attribute shall be used and "0" means the attribute shall not be used. |
| maxValueFacialExpressionBasisFlag | This field, which is only present in the binary representation, signals the presence of the activation attribute. A value of "1" means the attribute shall be used and "0" means the attribute shall not be used. |
| minValueFacialExpressionBasisFlag | This field, which is only present in the binary representation, signals the presence of the activation attribute. A value of "1" means the attribute shall be used and "0" means the attribute shall not be used. |
| neutralValueFacialExpressionBasisFlag | This field, which is only present in the binary representation, signals the presence of the activation attribute. A value of "1" means the attribute shall be used and "0" means the attribute shall not be used. |
| facialExpressionBasisUnitFlag | This field, which is only present in the binary representation, signals the presence of the activation attribute. A value of "1" means the attribute shall be used and "0" means the attribute shall not be used. |
| facialExpressionBasisID | Describes the identification of associated facial expression basis based as a reference to a classification scheme term provided by FacialExpressionBasisIDCS defined in A.X of ISO/IEC 23005-X. |

TABLE 13-continued

| Name | Definition |
| --- | --- |
| maxValueFacialExpressionBasis | Describes the maximum value of facial expression basis parameter. |
| minValueFacialExpressionBasis | Describes the minimum value of facial expression basis parameter. |
| neutralValueFacialExpressionBasis | Describes the value of facial expression basis parameter in neutral face. |
| facialExpressionBasisUnit | Describes the corresponding measurement units of the displacement amount described by a facial expression basis parameter. |

Table 14 shows a unit type, that is, a unit of length or distance, specific to measure a displacement of each facial expression basis, regarding the facial expression characteristics type, according to the example embodiments.

TABLE 14

```
<ClassificationScheme uri="urn:mpeg:mpeg-v:01-CI-UnitTypeCS-NS">
  <Term termId="IRISD">
    <Name xml:lang="en">IRIS Diameter</Name>
    <Definition xml:lang="en">
```

A unit of length or distance equal to one IRISD0/1024, specific to measure a displacement of each facial expression basis for an individual user.

```
    </Definition>
  </Term>
  <Term termId="ES">
    <Name xml:lang="en">Eye Separation</Name>
    <Definition xml:lang="en">
```

A unit of length or distance equal to one ES0/1024, which is specific to measure a displacement of each facial expression basis for an individual user.

```
    </Definition>
  </Term>
  <Term termId="ENS">
    <Name xml:lang="en">Eye-Nose Separation</Name>
    <Definition xml:lang="en">
```

A unit of length or distance equal to one ENS0/1024, which is specific to measure a displacement of each facial expression basis for an individual user.

```
    </Definition>
  </Term>
  <Term termId="MNS">
    <Name xml:lang="en">Mouth-Nose Separation</Name>
    <Definition xml:lang="en">
```

A unit of length or distance equal to one MNS0/1024, which is specific to measure a displacement of each facial expression basis for an individual user.

```
    </Definition>
  </Term>
  <Term termId="MW">
    <Name xml:lang="en">Mouth-Width Separation</Name>
    <Definition xml:lang="en">
```

A unit of length or distance equal to one MW0/1024, which is specific to measure a displacement of each facial expression basis for an individual user.

```
    </Definition>
  </Term>
  <Term termId="AU">
    <Name xml:lang="en">Angular Unit</Name>
    <Definition xml:lang="en">
A unit of plane angle equal to 1/100000 radian.
    </Definition>
  </Term>
</ClassificationScheme>
```

According to an aspect of the present disclosure, the virtual world processing apparatus 200 may further include an output unit 230.

The output unit 230 may output the generated facial expression data to the adaptation engine 120 to control the facial expression of the avatar in the virtual world. In addition, the output unit 230 may output the generated facial expression data to the server and store the facial expression data in the DB. The facial expression data stored in the DB may be used as the initialization intelligent camera device command.

The processing unit 220 may update, in real time, the facial expression basis range of the initialization information based on the sensed information received from the intelligent camera. That is, the processing unit 220 may update, in real time, at least one of the maximum value and the minimum value of the parameter value of the facial expression basis, based on the sensed information.

Depending on different embodiments, the processing unit 220 may obtain, from the sensed information, (1) a face image of the user, (2) a first matrix representing translation and rotation of a face of the user, and (3) a second matrix extracted from components of the face of the user. The processing unit 220 may calculate the parameter value of the facial expression basis based on the obtained information, that is, the face image, the first matrix, and the second matrix. In addition, the processing unit 220 may update at least one of the maximum value and the minimum value, in real time, by comparing the calculated parameter value of the facial expression basis and a previous parameter value of the facial expression basis. For example, when the calculated parameter value is greater than the previous parameter value, the processing unit 220 may update the maximum value into the calculated parameter value.

The foregoing operation of the processing unit 220 may be expressed by Equation 1 as follows.

$$\tau = \underset{V=\{\tau\}}{\operatorname{argmin}} \|R^{-1}T - \tau \cdot E\| \quad \text{[Equation 1]}$$

Here, T denotes the face image of the user, $R^{-1}$ denotes an inverse of the first matrix representing translation and rotation of the face of the user, and E denotes the second matrix extracted from the components of the face of the user. The components of the face of the user may include a feature point or a facial animation unit which is a basic element representing a facial expression. In addition, τ denotes a matrix indicating sizes of respective components.

For example, presuming that the neutral facial expression of the user, for example a blank face, is a neutral expression $T_0$, the processing unit 220 may extract τ meeting Equation 1 by a global optimization algorithm or a local optimization method, for example, gradient descent. Here, the extracted value may be expressed as $\tau_0$. The processing unit 220 may store the extracted value as a value constituting the neutral expression of the user.

In addition, presuming that various facial expressions of the user are a neutral expression T, the processing unit 220 may extract r meeting Equation 1 by a global optimization algorithm or a local optimization method such as gradient descent. Here, the processing unit 220 may use the extracted value in determining a minimum value and a maximum value of the facial expression basis range, that is, a range of the facial expressions that can be made by the user.

In this case, the processing unit 220 may determine the minimum value and the maximum value of the facial expression basis range using Equation 2.

$$\tau_{t,max} = \max\{\tau_{t-1,max}, \tau_t\}$$

$$\tau_{t,min} = \min\{\tau_{t-1,min}, \tau_t\} \quad \text{[Equation 2]}$$

Since an error may be generated during image estimation, the processing unit 220 may compensate an outlier when estimating $\tau_{t,\,max}$ and $\tau_{t,\,min}$ of Equation 2. Here, the processing unit 220 may compensate the outlier by applying smoothing or median filtering with respect to an input value $\tau_t$ of Equation 2. According to other example embodiments, the processing unit 220 may perform the compensation through outlier handling.

When a value estimated by the foregoing process does not change for a predetermined time, the processing unit 220 may determine the facial expression basis range using the maximum value and the minimum value determined by Equation 2.

Three values $\tau_0$, $\tau_{max}$, and $\tau_{min}$ estimated by the processing unit 220 may be used as initial parameters for generating the facial expression made by the user. For example, with regard to lips, the processing unit 220 may use a left end point of an upper lip as a neutral value, the maximum value, and the minimum value of a parameter of the facial expression basis determining a lip expression.

The processing unit 220 may control the parameter value of the facial expression basis of the avatar using a mapping function and sensed information. That is, the processing unit 220 may control the facial expression of the avatar using the mapping function.

The mapping function defines mapping relations between a range of the facial expression basis with respect to the user and a range of the facial expression with respect to the avatar. The mapping function may be generated by the processing unit 220.

When $\tau_0$ is input as the parameter value with respect to the facial expression basis of the user, the mapping function may output $\tau'_0$ as the parameter value with respect to the facial expression basis of the avatar. When $\tau_{max}$ is input as the parameter value with respect to the facial expression basis of the user, the mapping function may output $\tau'_{max}$ as the parameter value with respect to the facial expression basis of the avatar. Also, when $\tau_{min}$ is input as the parameter value with respect to the facial expression basis of the user, the mapping function may output $\tau'_{min}$ as the parameter value with respect to the facial expression basis of the avatar.

When a value between $\tau_{max}$ and $\tau_{min}$ is input, the mapping function may output an interpolated value using Equation 3.

$$\tau'_{t_t} = \begin{cases} (\tau'_{max} - \tau'_0)/(\tau_{max} - \tau_0) \times \\ \quad (\tau_t - \tau_0) + \tau'_0, & \text{if } \tau_{max} \geq \tau_t \geq \tau_0 \\ (\tau'_0 - \tau'_{min})/(\tau_0 - \tau_{min}) \times \\ \quad (\tau_t - \tau_0) + \tau'_0, & \text{if } \tau_0 > \tau_t \geq \tau_{min} \end{cases} \quad \text{[Equation 3]}$$

Figure 4:
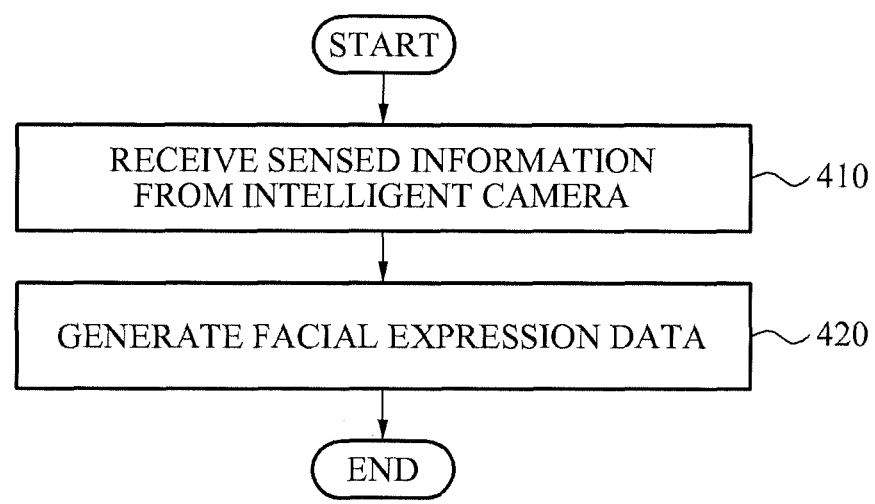
FIG. 4 illustrates a virtual world processing method, according to example embodiments.

FIG. 4 illustrates a virtual world processing method, according to example embodiments.

Referring to FIG. 4, in operation 410, the virtual world processing method may receive sensed information from an intelligent camera, the sensed information sensed by the intelligent camera with respect to a facial expression basis of a user.

The sensed information may include information on an intelligent camera facial expression basis type which defines the facial expression basis of the user, sensed by the intelligent camera. The intelligent camera facial expression basis type may include the facial expression basis. The facial expression basis may include at least one attribute selected from a facial expression basis ID for identification of the facial expression basis, a parameter value of the facial expression basis, and a parameter unit of the facial expression basis.

In operation 420, the virtual world processing method may generate facial expression data of the user, for controlling the facial expression of the avatar, using (1) initialization information denoting a parameter for initializing the facial expression basis of the user, (2) a 2D/3D model defining a coding method for a face object of the avatar, and (3) the sensed information.

The initialization information may denote a parameter for initializing the facial expression of the user. Depending on embodiments, for example, when the avatar represents an animal, a facial shape of the user in the real world may be different from a facial shape of the avatar in the virtual world. Accordingly, normalization of the facial expression basis with respect to the face of the user is required. Therefore, the virtual world processing method may normalize the facial expression basis using the initialization information.

The initialization information may be received from any one of the intelligent camera and an adaptation engine.

When the initialization information is sensed by the intelligent camera, the initialization information may include information on an initialization intelligent camera facial expression basis type that defines a parameter for initializing the facial expression basis of the user, sensed by the intelligent camera.

In addition, the initialization intelligent camera facial expression basis type may include at least one element selected from (1) a distance (IRISD0) between an upper eyelid and a lower eyelid in a neutral facial expression of the user, (2) a distance (ES0) between two eyes in the neutral facial expression, (3) a distance (ENS0) between the two eyes and a nose in the neutral facial expression, (4) a distance (MNS0) between the nose and a mouth in the neutral facial expression, (5) a width (MW0) of the mouth in the neutral facial expression, and (6) a facial expression basis range with respect to a parameter value of the facial expression basis of the user.

Elements of the facial expression basis range may include at least one attribute selected from an ID (FacialExpressionBasisID) for identification of the facial expression basis, a maximum value (MaxFacialExpressionBasisParameter) of the parameter value of the facial expression basis, a minimum value (MinFacialExpressionBasisParameter) of the parameter value of the facial expression basis, a neutral value (NeutralFacialExpressionBasisParameter) denoting the parameter value of the facial expression basis in the neutral facial expression, and a parameter unit (FacialExpressionBasisParameterUnit) of the facial expression basis.

When the initialization information stored in the DB of the adaptation engine or the server is called, the initialization information according to the example embodiments may include information on an initialization intelligent camera device command that defines a parameter for initializing the facial expression basis of the user, stored in the DB.

In addition, the initialization intelligent camera device command may include at least one element selected from (1) the distance (IRISD0) between the upper eyelid and the lower eyelid in the neutral facial expression of the user, (2) the distance (ES0) between two eyes in the neutral facial expression, (3) the distance (ENS0) between the two eyes and the nose in the neutral facial expression, (4) the distance (MNS0) between the nose and the mouth in the neutral facial expression, (5) the width (MW0) of the mouth in the neutral facial expression, and (6) the facial expression basis range with respect to the parameter value of the facial expression basis of the user.

Also, the elements of the facial expression basis range may include at least one attribute selected from the ID (FacialExpressionBasisID) for identification of the facial expression basis, the maximum value (MaxFacialExpressionBasisParameter) of the parameter value of the facial expression basis, the minimum value (MinFacialExpressionBasisParameter) of the parameter value of the facial expression basis, the neutral value (NeutralFacialExpressionBasisParameter) denoting the parameter value of the facial expression basis in the neutral facial expression, and the parameter unit (FacialExpressionBasisParameterUnit) of the facial expression basis.

According to an aspect of the present invention, the virtual world processing method may output the generated facial expression data to the adaptation engine to control the facial expression of the avatar in the virtual world. In addition, the virtual world processing method may output the generated facial expression data to a server and store the facial expression data in a DB. The facial expression data stored in the DB may be used as an initialization intelligent camera device command.

The virtual world processing method may update, in real time, the facial expression basis range of the initialization information based on the sensed information received from the intelligent camera. That is, the virtual world processing method may update, in real time, at least one of the maximum value and the minimum value of the parameter value of the facial expression basis, based on the sensed information.

Depending on different embodiments, to update the facial expression basis range, the virtual world processing method may obtain, from the sensed information, (1) a face image of the user, (2) a first matrix representing translation and rotation of a face of the user, and (3) a second matrix extracted from components of the face of the user. The virtual world processing method may calculate the parameter value of the facial expression basis based on the obtained information, that is, the face image, the first matrix, and the second matrix. In addition, the virtual world processing method may update at least one of the maximum value and the minimum value, in real time, by comparing the calculated parameter value of the facial expression basis and a previous parameter value of the facial expression basis. For example, when the calculated parameter value is greater than the previous parameter value, the virtual world processing method may update the maximum value into the calculated parameter value.

The virtual world processing method described above may be expressed by Equation 1-2.

$$\tau = \underset{V=\{\tau\}}{\mathrm{argmin}} \|R^{-1}T - \tau \cdot E\| \qquad \text{[Equation 1-2]}$$

Here, T denotes the face image of the user, $R^{-1}$ denotes an inverse of the first matrix representing translation and rotation of the face of the user, and E denotes the second matrix extracted from the components of the face of the user. The components of the face of the user may include a feature point or a facial animation unit which is a basic element representing a facial expression. In addition, $\tau$ denotes a matrix indicating sizes of respective components.

For example, presuming that the neutral facial expression of the user, for example a blank face, is a neutral expression $T_0$, the virtual world processing method may extract $\tau$ meeting Equation 1-2 by a global optimization algorithm or a local optimization method such as gradient descent. Here, the extracted value may be expressed as $\tau_0$. The virtual world processing method may store the extracted value as a value constituting the neutral expression of the user.

In addition, presuming that various facial expressions of the user are a neutral expression T, the processing unit 220 may extract $\tau$ meeting Equation 1 by a global optimization algorithm or a local optimization method such as gradient descent. Here, the processing unit 220 may use the extracted value in determining a minimum value and a maximum value of the facial expression basis range, that is, a range of the facial expressions that can be made by the user.

In this case, the virtual world processing method may determine the maximum value and the minimum value of the facial expression basis range using Equation 2-2.

$$\tau_{t,max} = \max\{\tau_{t-1,max}, \tau_t\}$$

$$\tau_{t,min} = \min\{\tau_{t-1,min}, \tau_t\} \qquad \text{[Equation 2-2]}$$

Since an error may be generated during image estimation, the virtual world processing method may compensate an outlier when estimating $\tau_{t,\,max}$ and $\tau_{t,\,min}$ of Equation 2-2. Here, the virtual world processing method may compensate the outlier by applying smoothing or median filtering with respect to an input value $\tau_t$, of Equation 2-2. According to other example embodiments, the virtual world processing method may perform the compensation through outlier handling.

When a value estimated by the foregoing process does not change for a predetermined time, the virtual world processing method may determine the facial expression basis range using the maximum value and the minimum value determined by Equation 2-2.

Three values $\tau_0$, $\tau_{max}$, and $\tau_{min}$ estimated by the virtual world processing method may be used as initial parameters for generating the facial expression made by the user. For example, in regard to lips, the virtual world processing method may use a left end point of an upper lip as a neutral value, the maximum value, and the minimum value of a parameter of the facial expression basis determining a lip expression.

The virtual world processing method may control the parameter value of the facial expression basis of the avatar using a mapping function and sensed information. That is, the virtual world processing method may control the facial expression of the avatar using the mapping function.

The mapping function defines mapping relations between a range of the facial expression basis with respect to the user and a range of the facial expression with respect to the avatar. The mapping function may be generated by the virtual world processing method.

For example, when $\tau_0$ is input as the parameter value with respect to the facial expression basis of the user, the mapping function may output $\tau'_0$ as the parameter value with is respect to the facial expression basis of the avatar. When $\tau_{max}$ is input as the parameter value with respect to the facial expression basis of the user, the mapping function may output $\tau'_{max}$ as the parameter value with respect to the facial expression basis of the avatar. Also, when $\tau_{min}$ is input as the parameter value with respect to the facial expression basis of the user, the mapping function may output $\tau'_{min}$ as the parameter value with respect to the facial expression basis of the avatar.

When a value between $\tau_{max}$ and $\tau_{min}$ is input, the mapping function may output an interpolated value using Equation 3-2.

$$\tau'_{t} = \begin{cases} (\tau'_{max} - \tau'_0)/(\tau_{max} - \tau_0) \times \\ \quad (\tau_t - \tau_0) + \tau'_0, & \text{if } \tau_{max} \geq \tau_t \geq \tau_0 \\ (\tau'_0 - \tau'_{min})/(\tau_0 - \tau_{min}) \times \\ \quad (\tau_t - \tau_0) + \tau'_0, & \text{if } \tau_0 > \tau_t \geq \tau_{min} \end{cases} \quad \text{[Equation 3-2]}$$

The methods according to the above-described example embodiments may be recorded in non-transitory computer-readable media including program instructions to implement various operations embodied by a computer. The embodiments may also be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially config-ured to store and perform program instructions, such as read-only memory (ROM), random access memory (RAM), flash memory, and the like. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Further, according to an aspect of the embodiments, any combinations of the described features, functions and/or operations can be provided.

Moreover, the virtual world processing apparatus, as shown in at least FIG. 2, may include at least one processor to execute at least one of the above-described units and methods.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A virtual world processing apparatus for controlling a facial expression of an avatar in a virtual world, by using a facial expression of a user in a real world, the apparatus comprising:
 a receiving unit configured to receive sensed information sensed by an intelligent camera, the sensed information relating to a facial expression basis of the user; and
 a computer processor configured to:
  generate facial expression data of the user, for controlling the facial expression of the avatar, by using: initialization information representing a parameter used for initializing the facial expression basis of the user, a 2-dimensional/3-dimensional (2D/3D) model defining a coding method for a face object of the avatar, and the received sensed information,
  obtain a face image of the user, a first matrix representing translation and rotation of a face of the user, and a second matrix extracted from components of the face of the user,
  calculate the parameter value of the facial expression basis, based on: the face image, the first matrix, and the second matrix, and
  update at least one of the maximum value and the minimum value of the facial expression basis, in real time, by comparing the calculated parameter value of the facial expression basis and a previous parameter value of the facial expression basis.

2. The virtual world processing apparatus of claim 1, further comprising:
 an output unit configured to output the facial expression data to an adaptation engine.

3. The virtual world processing apparatus of claim 2, wherein the output unit is configured to output the generated facial expression data to a server, and to store the generated facial expression data in a database.

4. The virtual world processing apparatus of claim 3, wherein the generated facial expression data stored in the database is used as an initialization intelligent camera device command that defines a parameter used for initializing the facial expression basis of the user.

5. The virtual world processing apparatus of claim 1, wherein the initialization information is received from any of: the intelligent camera and an adaptation engine.

6. The virtual world processing apparatus of claim 1, wherein the sensed information comprises at least one attribute selected from:
   an identifier (ID) used for identification of the facial expression basis;
   a parameter value of the facial expression basis; and
   a parameter unit of the facial expression basis.

7. The virtual world processing apparatus of claim 1,
   wherein the initialization information comprises an initial intelligent camera facial expression basis type that defines a parameter used for initializing the facial expression of the user, and
   wherein the initial intelligent camera facial expression basis type comprises at least one element selected from:
      a distance between an upper eyelid and a lower eyelid of the user while the user has a neutral facial expression;
      a distance between two eyes of the user while the user has the neutral facial expression;
      a distance between the two eyes and a nose of the user while the user has the neutral facial expression;
      a distance between the nose and a mouth of the user while the user has the neutral facial expression;
      a width of the mouth of the user while the user has the neutral facial expression; and
      a facial expression basis range with respect to a parameter value of the facial expression basis of the user.

8. The virtual world processing apparatus of claim 7, wherein the facial expression basis range comprises at least one attribute selected from:
   an identification (ID) of the facial expression basis;
   a maximum value of the parameter value of the facial expression basis;
   a minimum value of the parameter value of the facial expression basis;
   a neutral value, denoting the parameter value of the facial expression basis while the user has the neutral facial expression; and
   a parameter unit of the facial expression basis.

9. The virtual world processing apparatus of claim 8, wherein the computer processor is configured to update at least one of the maximum value and the minimum value, in real time, based on the sensed information.

10. The virtual world processing apparatus of claim 7, wherein the computer processor is configured to control the parameter value of the facial expression basis, by using the sensed information and a mapping function that defines relations between: the facial expression basis range with respect to the user, and a facial expression basis range with respect to the avatar.

11. The virtual world processing apparatus of claim 1, wherein the computer processor is configured to normalize the facial expression basis by using the initialization information, when a facial shape of the user in the real world is different from a facial shape of the avatar in the virtual world.

12. The virtual world processing apparatus of claim 1, wherein the 2D/3D model comprises: a face description parameter (FDP) which defines a face of the user, and a facial animation parameter (FAP) which defines motions of the face of the user.

13. The system for enabling interaction between a real world and a virtual world of claim 1, wherein the maximum value is updated when the calculated parameter value of the facial expression basis is greater than the previous parameter value of the facial expression basis.

14. A virtual world processing apparatus for controlling a facial expression of an avatar in a virtual world, by using a facial expression of a user in a real world, the apparatus comprising:
   a receiving unit configured to receive sensed information sensed by an intelligent camera, wherein the sensed information relates to a facial expression basis of the user; and
   a computer processor configured to generate facial expression data of the user, for controlling the facial expression of the avatar, by using: initialization information representing a parameter used for initializing the facial expression basis of the user, a 2-dimensional/3-dimensional (2D/3D) model defining a coding method for a face object of the avatar, and the sensed information received from the intelligent camera;
   wherein the initialization information comprises an initial intelligent camera facial expression basis type that defines a parameter used for initializing the facial expression of the user, and
   wherein the initial intelligent camera facial expression basis type comprises at least one element selected from:
      a distance between an upper eyelid and a lower eyelid of the user while the user has a neutral facial expression,
      a distance between two eyes of the user while the user has the neutral facial expression,
      a distance between the two eyes and a nose of the user while the user has the neutral facial expression,
      a distance between the nose and a mouth of the user while the user has the neutral facial expression,
      a width of the mouth of the user while the user has the neutral facial expression, and
      a facial expression basis range with respect to a parameter value of the facial expression basis of the user;
   wherein the facial expression basis range comprises at least one attribute selected from:
      an identification (ID) of the facial expression basis,
      a maximum value of the parameter value of the facial expression basis,
      a minimum value of the parameter value of the facial expression basis,
      a neutral value, denoting the parameter value of the facial expression basis while the user has the neutral facial expression, and
      a parameter unit of the facial expression basis;
   wherein the computer processor is configured to update, in real time, at least one of the maximum value and the minimum value, based on the sensed information;
   wherein the computer processor is configured to obtain a face image of the user, a first matrix representing translation and rotation of a face of the user, and a second matrix extracted from components of the face of the user;
   wherein the computer processor is configured to calculate the parameter value of the facial expression basis, based on: the face image, the first matrix, and the second matrix; and
   wherein the computer processor is configured to update at least one of the maximum value and the minimum value, in real time, by comparing the calculated parameter value of the facial expression basis and a previous parameter value of the facial expression basis.

15. The virtual world processing apparatus of claim 14, wherein the maximum value is updated when the calculated parameter value of the facial expression basis is greater than the previous parameter value of the facial expression basis.

16. The virtual world processing apparatus of claim 14,
wherein the computer processor is configured to compensate an outlier, with respect to the calculated parameter value of the facial expression, and
wherein the computer processor is configured to update at least one of the maximum value and the minimum value, in real time, by comparing the outlier-compensated parameter value of the facial expression basis and the previous parameter value of the facial expression basis.

17. A virtual world processing method for controlling a facial expression of an avatar in a virtual world, by using a facial expression of a user in a real world, the method comprising:
receiving sensed information sensed by an intelligent camera, the sensed information relating to a facial expression basis of the user; and
generating facial expression data of the user, for controlling the facial expression of the avatar, by using initialization information representing a parameter used for initializing the facial expression basis of the user, a 2-dimensional/3-dimensional (2D/3D) model defining a coding method for a face object of the avatar, and the sensed information received from the intelligent camera;
obtaining a face image of the user, a first matrix representing translation and rotation of a face of the user, and a second matrix extracted from components of the face of the user;
calculating the parameter value of the facial expression basis, based on: the face image, the first matrix, and the second matrix; and
updating, in real time, at least one of the maximum value and the minimum value of the facial expression basis, by comparing the calculated parameter value of the facial expression basis and a previous parameter value of the facial expression basis.

18. A non-transitory computer readable recording medium storing a program to cause a computer to implement the method of claim 17.

19. A virtual world processing method, the method comprising:
receiving sensed information sensed by camera sensor, the sensed information relating to a facial expression basis of a user in a real world; and
controlling, by use of a computer processor, a facial expression of an avatar in a virtual world, by using facial expression data generated based on the sensed information received from the camera sensor;
obtaining a face image of the user, a first matrix representing translation and rotation of a face of the user, and a second matrix extracted from components of the face of the user; and
updating, in real time, at least one of the maximum value and the minimum value of the facial expression basis, by comparing the calculated parameter value of the facial expression basis and a previous parameter value of the facial expression basis;
wherein the parameter value of the facial expression basis is based on: the face image, the first matrix, and the second matrix.

20. The virtual world processing method of claim 19, wherein the controlling the facial expression of the avatar is further based on: initialization information representing a parameter used for initializing a facial expression basis of the user, and a 2-dimensional/3-dimensional (2D/3D) model defining a coding method for a face object of the avatar.

* * * * *